F. HORN.
BRAKE MECHANISM.
APPLICATION FILED FEB. 6, 1911.
1,147,507.
Patented July 20, 1915.
2 SHEETS—SHEET 1.
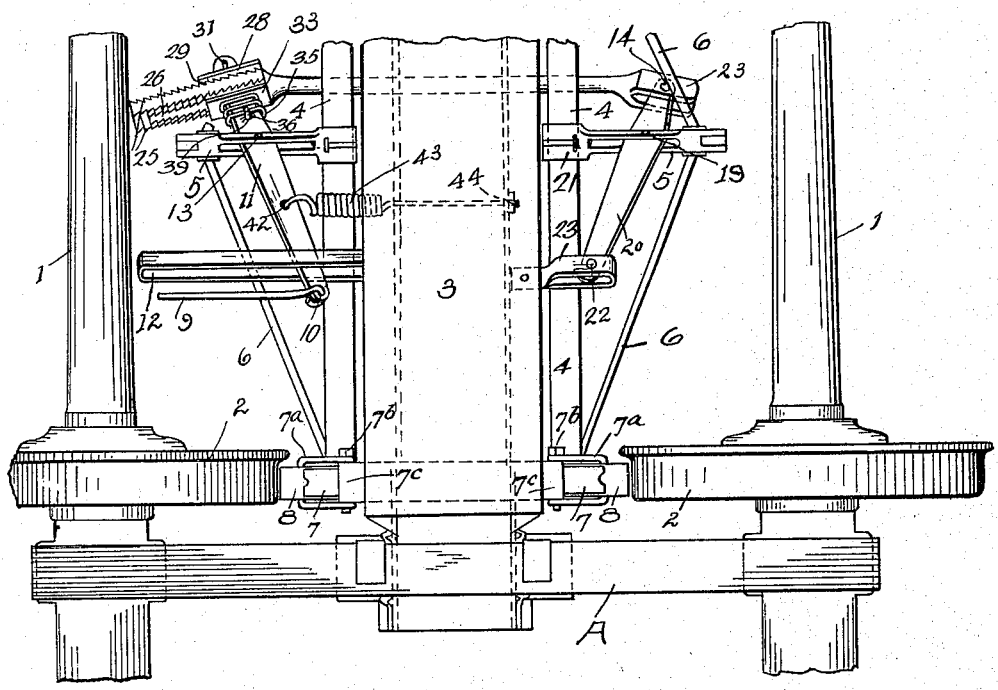
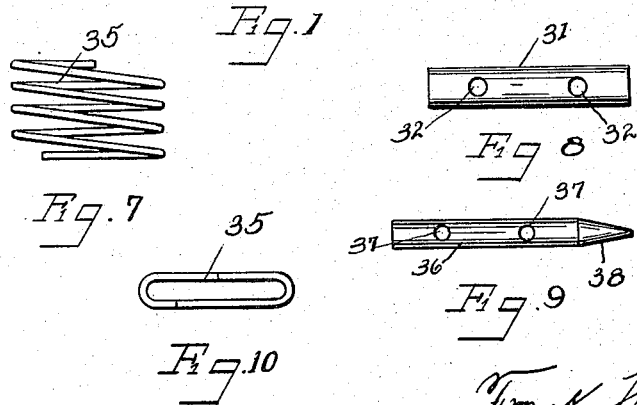

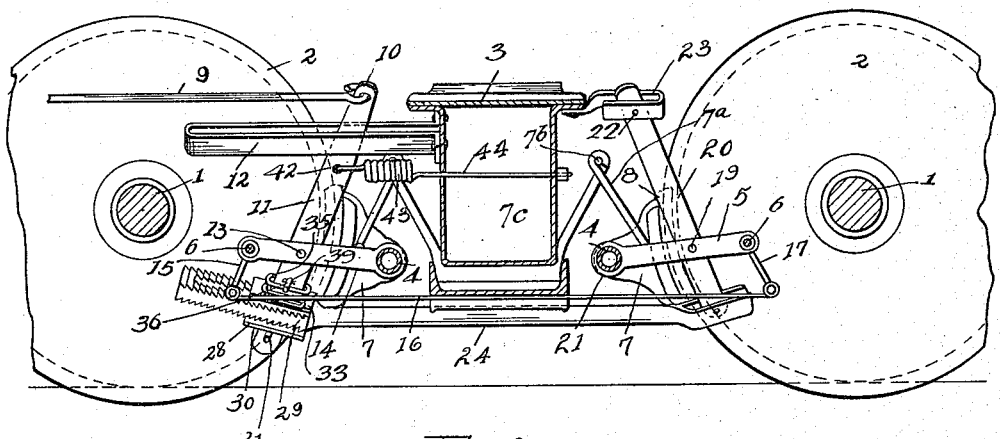

UNITED STATES PATENT OFFICE.

FRANK HORN, OF COLUMBUS, OHIO.

BRAKE MECHANISM.

1,147,507.          Specification of Letters Patent.      Patented July 20, 1915.

Application filed February 6, 1911. Serial No. 606,796.

*To all whom it may concern:*

Be it known that I, FRANK HORN, a citizen of the United States, residing at Columbus, in the county of Franklin and State of Ohio, have invented certain new and useful Improvements in Brake Mechanism, of which the following is a specification.

The present invention relates to certain novel and useful improvements in brake mechanism and has particular application to automatic adjusting means for taking up the slack of the brakes of railway trains, cars and the like.

In carrying out my invention, it is my purpose to provide an automatic slack adjuster, adapted to eliminate the excess of slack in the brake connection of cars, whereby a practically uniform pressure of the brake shoes upon the car wheels, is attained, resulting from the piston travel being maintained constant at the brake cylinder. This piston travel is regulated by the amount of slack at the brakes, and by certain features of construction in taking up such slack through lengthening the connection between the truck levers, the correct alinement of the levers is maintained, and the maximum efficiency of the brakes is at all times rendered automatically available.

Still a further object of my invention is to provide an automatic slack adjuster embracing the desired features of simplicity, durability and strength, and one wherein the existing elements of well known brake structures, may be utilized to a great degree.

Another object of my invention is to provide mechanism of the character described, which is positive and efficient in action and which may be constructed to take up slack at any desired amount of piston travel, by regulating the dimensions of the teeth on the rack of the bottom connection, and upon the rack shoes respectively.

I also aim to provide a slack adjuster which will operate with either hand brakes or air brakes, and which is readily accessible for the purpose of renewing the brake shoes, or performing other work.

While I have herein shown and described my invention as applied to one particular type of brake mechanism, I wish it to be understood that I do not limit myself to the employment of my invention in connection with this particular type of mechanism, as it may be used with other forms of brake devices without departing from the invention, or exceeding the scope of the appended claims.

My invention consists in the construction, combination and arrangement of parts set forth in and falling within scope of the appended claims.

In the accompanying drawings—Figure 1 is a top plan view of a portion of a car truck and showing my invention employed in connection with the brake mechanism, Fig. 2 is a view in side elevation of a car truck having my automatic slack adjuster applied thereto, the bolster of the truck being shown in section, Fig. 3 is a top plan view of the bottom connecting rod showing the rack formed in one end thereof, Fig. 4 is a side view of the same, Fig. 5 is a face view of one of the rack shoes and showing the serrated surface thereof, Fig. 6 is a longitudinal sectional view upon the line 6—6 of Fig. 5, Fig. 7 is a view in side elevation of the tension spring which bears against the upper rack shoe, Fig. 8 is a detail view showing the pin carried by the live lever and adapted to support the bottom rack shoes, Fig. 9 is a detail view of the pin for retaining the tension spring shown in Fig. 7 in position, and, Fig. 10 is a top plan view of the spring shown for maintaining the shoe in connection with the rack.

Referring now to the accompanying drawings in detail, A designates the truck as an entirety, and the numerals 1 designate the axles, while the wheels are shown at 2. The central truck bolster is indicated by the numeral 3 and the brake beams are shown at 4, said beams carrying the struts 5, to which in turn are connected the tension members 6, leading to the brake heads 7, there being as usual one head for each wheel, and each head is provided with a brake shoe 8. These brake heads are carried by brake hangers 7$^a$ pivotally mounted as at 7$^b$ to brake hanger brackets 7$^c$, which are in turn supported in any well known manner by the bolster 3. The push or pull rod 9 leading from the brake cylinder is connected as at 10 to the live lever 11, moving within the lever guide 12, and pivoted as at 13 to the strut 5 of the brake beam.

The numeral 15 is a short connecting link of a well known mechanism for keeping the brake shoes out of engagement with the wheels when the brakes are in full released position which connects the strut 5 with the spring rod 16 leading toward the brake beam of the other set of truck wheels, said spring rod being connected with the short link 17, which in turn connects with the strut 5. The dead lever 20 is pivoted at 19 to the strut 5, said strut 5 being also secured to the brake beam as at 21, and the dead lever at its upper end is adapted to be pivoted as at 22 to the fulcrum-bar 23, the lever guide of the dead lever and the fulcrum bar of the dead lever both being connected with the truck bolster.

The numeral 24 designates the connector or bottom connection rod, one end of which is offset and has its upper and lower faces serrated in staggered relation with each other as at 25 to form rack surfaces, this end being slotted as at 26 to permit the passage therethrough of the lower end of the live lever 11, so that the end of the bottom connection rod is carried in loose engagement with the lower end of the live lever.

At 28 is shown the lower rack shoe, shown in detail in Figs. 5 and 6, having the surface which contacts with the rack of the rod, serrated or toothed as at 29 to correspond with the serrations 25 on the connection rod 24, and having its outer face plain and formed with a flange 30, which face is adapted to contact with the pin 31, shown in detail in Fig. 8, passing transversely through the lower end of the live lever, said pin having apertures 32 therein for the reception of cotter pins. Instead of employing a pin with a boss or head, such as is commonly used in practice, and which head would be liable to come in contact with the lower shoe, and thereby dislodge the same or otherwise interfere with its operation, I prefer to employ a pin such as is shown, comprising a shank or body having the openings therein for the reception of cotter pins, the body of the pin outside the openings forming a smooth firm bearing for the lower rack shoe. This lower rack shoe is also provided with an opening or slot 34 to permit the passage of the end of the live lever, and such opening is central as regards the width of the shoe, but is preferably slightly offset as to length, to provide more metal at the portion through which the force is transmitted. The upper rack shoe shown at 33 is identical in construction with the lower rack shoe, so that the shoes may be used interchangeably, thereby obviating the possibility of an unskilled workman making a mistake in the application of the shoe. This slot is enough longer than the lever is wide, to admit of slight play and allow such angularity of lever as may be necessary. In fact, I find it advisable to offset the slots in the rack shoes longitudinally thereof also for the purpose of assisting in maintaining the lever mechanism in proper position of alinement.

The flanges 30 which are in the nature of lateral wings or extensions of the shoes, are adapted to aid the operation of removing the shoes from the rack, when it is desired to return the rack shoes to initial positions. Said flanges form projections which may be grasped by the operator in one manner of making the change, or the flanges may form bearings for a suitable tool which may be employed in prying or forcing the rack shoes apart.

The upper shoe which has its serrated face in engagement with the upper rack, is resiliently held in position through the medium of a tension member in the nature of a coiled spring 35, shown in detail in Figs. 7 and 10, where it will be noted that such spring is substantially oblong, thereby forming a bearing surface for contact with the shoe and with the retaining pin 36, which passes through the live lever and holds the spring in place. This pin is shown in detail in Fig. 9 and has two holes 37 for the reception of cotter pins, the end of said pin 36 being beveled or pointed as at 38, so that when the spring is free, the pin may find ready entrance to the hole 39 in the lever and at the same time subject the spring to slight tension.

The opposite end of the connection rod 24 from that carrying the rack, is formed with a bifurcated end portion 40 having apertures 41 therein, to which may be pinned the lower end of the dead lever. The live lever has connected thereto as at 42, one end of the release spring 43, the opposite end of said spring being fast to the bolster as at 44.

The above is a detailed description of my slack absorbing mechanism shown applied to a well known type of brake mechanism, it being understood that it is equally as applicable to various other brake mechanisms now in general use.

The operation of my device is as follows: A pull upon the rod 9 from the air cylinder (not shown) will cause the live lever 11 to move forward about the serrated portion of the connection rod 24 as a fulcrum point. This forward movement carries the brake shoes forward into braking engagement with the periphery of the wheels 2. When the brake shoes adjacent the live lever have come into contact with the corresponding wheel, the fulcrum point of the live lever is changed to the pivot point 13 and the connection rod 24 is forced rearwardly by the action of the lower end of the lever bearing upon one wall of the slot 34 in the lower rack shoe 29, it being understood that this rack shoe is held in interlocking relation with the lower serrated surface 25 of the offset end of the connection rod 24. This rearward movement of the connection rod causes the dead lever 20 to pivot about its fulcrum point 22, thereby forcing the opposite brake shoe into braking engagement with its corresponding wheel. As stated, the rack shoes are held in comparatively loose engagement with the rack portions of the connection rod through the medium of the spring 35 and, as already stated, under normal conditions the dead lever is actuated by the action of the live lever bearing upon the lower rack shoe while the same is thus held in its engagement with the lower rack surface. However, should the brake shoes have become worn, or should any of the other portions of the mechanism have become worn so that an amount of travel of the live lever in excess of what is normal is required to give the desired braking effect, this excess amount of travel causes the live lever to bear against one of the short walls of the slot 34 in the upper rack shoe and, since this shoe is resiliently held in position by means of the spring 35, it will be made to climb the corresponding serrations upon the upper surface of the offset end of the connection rod 24. When this excess movement has reached a predetermined amount, the longitudinal movement of the upper rack shoe will be enough to cause it to move the distance of one tooth, in which position it will again be resiliently held by the spring 35. When this longitudinal movement of the upper rack shoe has taken place, return movement of the live lever 11 pivoting about the point 13 will cause the lower end of this lever to bear upon one of the short walls of the slot 34 in the lower rack shoe and will cause it also to move the distance of one tooth. In this manner, when there has resulted an excess amount of slack, it will be automatically taken up by the mechanism of my invention as above described. I have resorted to the use of the spring 35 for resiliently holding the rack shoe in position, but I wish it to be understood that the use of this spring is not absolutely essential as the parts will properly perform their function by the action of gravity alone, although their operation is made more positive by the use of this spring.

What I claim, is—

1. In an automatic slack adjuster for brake mechanism, the combination with the brake mechanism including the brake shoes and actuating levers therefor, and mechanism extending between said levers including a rack and a plurality of shoes adapted to move along said rack to take up slack, said shoes being capable of independent vertical and horizontal movement with reference to the levers.

2. In an automatic slack adjuster, the combination with brake mechanism, including a plurality of brake shoes and actuating levers therefor, of a connector extending between said levers, and means for varying the distance between the levers in contact with said connector, said means consisting of a rack formed on one end of said connector, and rack shoes adapted to engage said rack; said rack and rack shoes being carried in loose engagement upon one of said levers, said rack and rack shoes being capable of independent vertical and horizontal movement with reference to said lever.

3. In an automatic slack adjuster, the combination with brake mechanism, including a plurality of brake shoes and actuating levers therefor, a connector extending between said levers having one end formed with a rack loosely supported from one of said levers, a plurality of rack shoes identical in structure, adapted to engage said rack and be carried on either side thereof upon said lever, said rack shoes being adapted upon the movement of said lever to travel along said rack, thereby to change relative position of said rack with reference to said lever, and means for tensioning said rack shoes, said means consisting of a tension member bearing on the back face of one of said rack shoes and a tapered pin adapted to stop movement of said tension member.

4. In an automatic slack adjuster, the combination with brake mechanism including the brake shoes and live and dead levers therefor, of a connector having one end connected to the dead lever and its opposite end formed with a rack slotted to permit the passage therethrough of the live lever, slotted rack shoes adapted to engage with said rack and to be operated by the movement of the live lever to vary the length of the connector relative to the live and dead levers and thereby take up slack, said rack and rack shoes being capable of a limited horizontal and vertical movement with reference to the live lever.

5. In an automatic slack adjuster, the combination with brake mechanism, including the brake shoes and live and dead levers therefor, and means whereby the live lever is caused to assume a full release position when brakes are not applied, said means, through the medium of said levers preventing brake shoe contact with the periphery of the wheels when the brakes are released, a bottom connector connected to the dead lever and having a rack portion loosely suspended from the live lever, upper and lower shoes adapted to slide upon said rack, a pin carried by the live lever and adapted to form a restricted sliding bearing for the lower rack shoe, a tension spring above the upper rack shoe and tensioned against said lever and a tapered pin adapted to hold said spring in position.

6. In an automatic slack adjuster, the combination with the brake mechanism including the brake shoes and operating levers therefor, of a connector fastened to one of said levers and having a slotted rack at its opposite end whereby it is held in loose engagement with the opposite lever, rack shoes carried by said lever and loosely engaging said rack and adapted to be actuated by the said lever upon the application of the brake to move along said rack and thereby vary the relative position of said levers associated with said connector, means for assuring engagement of said rack shoes with said rack, said means consisting of a plurality of pins and a tension member, one of said pins being tapered and said rack shoes being provided with flanged portions to facilitate releasing said rack shoes from engagement with said rack when so desired.

7. In a brake mechanism, the combination of a plurality of brake levers and a connector therefor, said brake levers being adapted to actuate each other when braking force is applied, through the medium of said connector, said connector being provided with a rack and rack shoes at one of its extremities, said rack and rack shoes being carried in loose engagement on one of said levers and adapted when actuated by said lever to vary the length of said connector, said rack and rack shoes being capable of independent lateral and longitudinal action with reference to said lever.

8. In a brake mechanism, the combination of the brake shoes and levers therefor, a connector between said levers formed with a rack at one end, said rack being carried in loose engagement on one of said levers, a plurality of rack shoes adapted to engage said rack, being carried in loose engagement on said lever on opposite sides of said rack, said rack shoes being adapted when actuated by said lever to travel along said rack to vary the distance between the levers directly associated with said connector, said rack shoes being identical in structure and said rack so arranged that said shoes when fully engaged with said rack, said lever being in full release position, will be out of alinement with reference to each other.

9. In a brake mechanism the combination of a plurality of brake shoes and actuating levers therefor, a connector between said levers, said connector having one end pivotally connected to its lever, the remaining end being slotted, the opposite edges of said slotted portion being serrated to form a rack, said slotted end being carried in loose engagement on its lever, a plurality of rack shoes being adapted to engage said rack, said rack shoes being carried in loose engagement on said lever on either side of said rack, said rack shoes being adapted, when actuated by said lever, to travel along said rack to vary the distance between said levers, said rack shoes being capable of independent longitudinal movement as regards said lever, said rack shoes being provided with flanged portions to facilitate their disengagement from said rack.

10. In a brake mechanism, the combination of a plurality of actuating levers and a connector therefor, said connector being formed with a rack on one end, a plurality of rack shoes adapted to engage said rack, said rack and each of said rack shoes being carried in loose engagement on one of said levers and capable of independent transverse and longitudinal movement with reference to said lever.

11. In a brake mechanism, the combination of a plurality of brake shoes and actuating levers therefor, a connector between said levers, said connector formed with a slotted end having two opposite edges serrated to form a rack, said rack being carried in loose engagement on one of said levers, a plurality of rack shoes adapted to engage said rack carried on either side of said rack upon said lever, said rack shoes being adapted to travel along said rack when actuated by said lever, said rack and rack shoes being capable of independent lateral and longitudinal motion with reference to said lever, a tension member being adapted to maintain contact between said rack shoes and said rack, being carried on said lever, means for retaining said tension member, rack and rack shoes upon said lever.

12. In a brake mechanism, the combination of a plurality of brake shoes and actuating levers therefor, a member adapted to connect said levers, said member being formed with one end slotted to admit passage of one of said levers therethrough, said slotted end portion having its opposite edges serrated to form a rack, rack shoes adapted to engage either face of said rack, said rack shoes being carried in lateral and longitudinal loose engagement upon said lever, and means for retaining said rack and rack shoes upon said lever, said means being also adapted to assure contact of said rack shoes with said rack.

13. In a brake mechanism, the combination of a plurality of brake shoes and actuating levers therefor, a connector between said levers, said connector having one end slotted to permit passage of the lever therethrough, said bifurcation having its two opposite edges serrated to form a rack, two rack shoes, identical in structure, adapted to engage said rack, said rack being carried in loose engagement upon said lever, said rack shoes being carried in loose engagement on either side of said rack upon said lever, said rack shoes being adapted when actuated by said lever, to travel along said rack to vary the length of said connector between said levers, said actuating lever being provided with means whereby when braking force is withdrawn, said lever is caused to assume its normal position, a tension member, and a plurality of pins carried by said lever, said tension member and said pins being adapted to assure continual contact of said rack shoes with said rack and to retain said rack and rack shoes in loose engagement with said lever, said rack shoes being provided with flanges to facilitate their disengagement from the rack when one of said pins is withdrawn or to afford means whereby said tension member may be compressed to admit of such disengagement of the rack shoes and rack.

14. In a brake mechanism, the combination of a plurality of brake shoes and levers therefor, a connector for said levers, said connector being pivoted at one end to its lever and having its opposite end slotted and carried in loose engagement on its lever, opposite edges of said slotted portion being serrated to form a rack, rack shoes adapted to engage said rack and be carried in loose engagement on either side of said rack by said lever, means for assuring contact of said rack shoes with said rack and for retaining said rack shoes and rack upon said lever, said lever being the actuator whereby the rack shoes may be caused to travel along the rack to vary the distance between the levers at opposite ends of the connector, said actuating lever being provided with a tension member, said tension member assuring said lever to assume its normal position when the brake is released, said rack shoes being capable of independent movement with reference to said lever and rack.

15. In a brake mechanism, the combination of a plurality of brake shoes and levers therefor, a connector for said levers, said connector having one end pivoted to its lever and its opposite end slotted and carried in loose engagement on its lever, opposite edges of said slotted portion being serrated to form a rack, a plurality of rack shoes adapted to engage with said rack, carried in loose engagement on either side of said rack upon said lever and capable of being actuated thereby, means for assuring said rack shoes in contact with the rack, said rack shoes being provided with flanges or projections to facilitate their being disengaged from the rack when so desired.

16. In a brake mechanism, the combination of a plurality of brake shoes and levers therefor, a connector, said connector being pivoted at one end to its lever and slotted at its opposite end, said slotted end having its opposite edges serrated to form a rack and carried in loose engagement on its lever, said slot being adapted to admit of lateral independent motion as regards lever and rack, a plurality of rack shoes adapted to engage with said rack having a restrictive sliding bearing on said lever on either side of said rack, said rack shoes being held in contact with the rack by means of a plurality of pins and a tension member, said rack shoes when actuated by said lever, being adapted to travel along said rack to cause said rack to vary its relative position with said lever to vary the effective length of said connector between said levers.

17. In a brake mechanism, the combination of a plurality of brake shoes and levers therefor, a connector, said connector being adapted to cause the brake shoes to be in close contact with the periphery of the wheels, one end of said connector being pivoted to its lever, the remaining end being slotted and carried in loose engagement on its lever, said slotted portion having its opposite edges serrated to form a rack, rack shoes adapted to engage said rack and formed with flanges to facilitate their disengagement from said rack, said rack shoes being carried in loose engagement on either side of said rack by said lever, and said rack shoes when actuated by said lever, adapted to move along said rack to vary the effective length of said connector connecting said levers, means for retaining the rack and shoes upon said lever and assuring their contact, said means consisting of a plurality of pins and a tension member, said pins being adapted to afford an even bearing where held in contact with adjacent parts, one of said pins having a tapered portion.

18. In a brake mechanism, the combination of the actuating levers and a connector therefor, said connector being provided at one end with a rack upon opposite surfaces, said rack being carried in loose engagement on one of said levers, rack shoes adapted to engage said rack and carried in close contact on either side of said rack upon said lever, said rack and rack shoes being capable of independent lateral action as regards said lever, means for assuring close contact of said rack shoes and rack, means for disengaging said rack shoes from said rack, said means consisting of flanges formed integral with said rack shoes.

19. In a brake mechanism, the combination of the actuating levers, a connector therefor and means whereby the distance between the levers may be varied, said means consisting of a rack and rack shoes, means whereby the rack and rack shoes are held in close contact, means whereby one or more of said levers is caused to return to release position when braking force is withdrawn, said rack shoes being provided with flanges or projections whereby they may be disengaged from said rack.

20. In a brake mechanism, the combination of the actuating levers and a connector therefor, means for eliminating excess slack, said means consisting of a rack formed on opposite surfaces of one end of said connector and rack shoes adapted to engage said rack and be carried in loose engagement with said rack on one of said levers, said rack shoes being provided with flanges or projections whereby they may be readily disengaged from the rack.

21. In a brake mechanism, the combination of the levers and a connector therefor, said levers being adapted to, when actuated by braking force, cause the brake shoes to be in close contact with the periphery of the car wheels, said connector being provided with a rack on one end, rack shoes adapted to engage such rack, said rack and rack shoes carried in contact on, and capable of independent lateral action with reference to one of said levers, said lever being provided with a retractor whereby it is caused to assume original position when braking force is withdrawn.

In testimony whereof I affix my signature in presence of two witnesses.

FRANK HORN.

Witnesses:
RICHARD B. CAVANAGH,
JOHN H. EAGLESON.

Copies of this patent may be obtained for five cents each, by addressing the "Commissioner of Patents, Washington, D. C."